(12) United States Patent
Orischak et al.

(10) Patent No.: US 6,969,102 B2
(45) Date of Patent: Nov. 29, 2005

(54) MOBILE DESIGN AND FABRICATION STUDIO

(75) Inventors: Douglas W. Orischak, Hunker, PA (US); Stephanie D. Collins, Lawrenceburg, TN (US)

(73) Assignee: Menasha Corporation, Neenah, WI (US)

( * ) Notice: Subject to any disclaimer, the term of this patent is extended or adjusted under 35 U.S.C. 154(b) by 7 days.

(21) Appl. No.: 10/755,604

(22) Filed: Jan. 12, 2004

(65) Prior Publication Data

US 2004/0140683 A1 Jul. 22, 2004

Related U.S. Application Data

(60) Provisional application No. 60/439,707, filed on Jan. 13, 2003.

(51) Int. Cl.[7] .............................................. B60P 3/00
(52) U.S. Cl. .................................................. 296/24.32
(58) Field of Search ......................... 296/24.32, 24.36, 296/24.37, 24.38, 24.39

(56) References Cited

U.S. PATENT DOCUMENTS

| | | | | |
|---|---|---|---|---|
| 3,583,368 A | * | 6/1971 | Mandelhaum et al. ... | 296/24.32 |
| 4,159,831 A | * | 7/1979 | Schorr ...................... | 211/49.1 |
| 4,643,476 A | * | 2/1987 | Montgerard .............. | 296/24.32 |
| 5,106,141 A | * | 4/1992 | Mostashari ............... | 296/24.39 |
| 5,853,215 A | * | 12/1998 | Lowery .................... | 296/24.32 |
| 6,325,435 B1 | * | 12/2001 | Dubuc ...................... | 296/24.32 |
| 6,394,523 B1 | * | 5/2002 | Yoo et al. ................ | 296/24.32 |
| 6,497,442 B1 | * | 12/2002 | Wacker .................... | 296/24.32 |

OTHER PUBLICATIONS

Barco; Samples Made Simple: The Kongsberg XL-Series, pp. 1-4.
Barco Graphic Systems; Packaging: XL20 Smplemaking Table; http://unix.barco.com/graphics/packaging/products/x120.htm; Nov. 8, 2002, pp. 1-2.

* cited by examiner

*Primary Examiner*—Lori L. Coletta
(74) *Attorney, Agent, or Firm*—Quarles & Brady LLP

(57) ABSTRACT

A mobile studio for designing and/or fabricating corrugated paperboard products includes a cutting table disposed in the enclosure for cutting and scoring sheets of corrugated paperboard. A computer is also disposed in the enclosure for designing the product and controlling the cutting table. The studio may be transported to a customer's location to design and fabricate a prototypical corrugated paperboard product (e.g. POP displays and packaging) on-site.

17 Claims, 12 Drawing Sheets

MOBILE DESIGN AND FABRICATION STUDIO

CROSS REFERENCE TO RELATED APPLICATIONS

This claims the benefit of U.S. Provisional Patent Application No. 60/439,707 filed Jan. 13, 2003.

STATEMENT REGARDING FEDERALLY SPONSORED RESEARCH OR DEVELOPMENT

--

BACKGROUND OF THE INVENTION

The present invention relates generally to the fabrication of corrugated paperboard products, and in particular relates to a method and apparatus for designing and fabricating prototypical corrugated paperboard structures on-site.

Foldable, corrugated "point of purchase" (POP) display stands have been used widely in the advertising and retail businesses for displaying announcements and merchandise for sale to consumers. POP packaging is also necessary when introducing a given product on the commercial market. POP displays and packaging are typically formed from corrugated paperboard, which is an inexpensive and efficient method of mass production. However, transitioning from the initial design to final assembly using conventional techniques can be tedious and time consuming.

In particular, a number of steps must be performed in order to advance from the conception stage of a commercial product to the point where the product is ready to be introduced in the marketplace. All of these stages, such as the design phase, prototype manufacturing, product testing phase, and market testing phase, consume valuable time. Once all these phases have been satisfactorily completed, it then becomes desirable to introduce the product to the commercial market as soon as possible. The final phase, then, is the design and fabrication of point-of-purchase (POP) displays and packaging for the product. It should be appreciated that time dedicated to the POP displays and packaging delays the prompt introduction of the product to the marketplace.

It is thus desirable for the designer and manufacturer of POP displays and packaging to arrive at a prototype suitable for its customer's product as quickly as possible. Conventional methods include obtaining general design specifications and dimensions of displays and packaging from the customer, and subsequently designing and fabricating a prototype. The prototype is then shipped to the customer for review and testing. Typically, the customer will demand that changes be made to the initial design. Additional time is thus needed for the manufacturer to revise, fabricate, and ship the revised design for review. The process of fabricating a suitable prototype typically requires several iterations of design, fabrication, review, and modification before the packaging and displays are approved to be mass-produced, it being appreciated that each iteration requires time consuming travel or transportation of the proposed prototype. Furthermore, communicating the necessary revisions can prove difficult when the manufacturer and customer are disposed at remote locations, or the input of several different departments (e.g. marketing, purchasing, production) of the customer are required to produce a suitable prototype design.

What is therefore needed is a method and apparatus for increasing efficiency between a manufacturer and a customer when designing and fabricating suitable POP displays and packaging.

BRIEF SUMMARY OF THE INVENTION

In accordance with one aspect of the invention, a mobile studio includes a housing defining an enclosure. The housing is supported by ground-engaging wheels. The enclosure includes a table carrying tooling for performing at least one of cutting and scoring sheets of corrugated paperboard. The enclosure further includes a computer executing a stored program for designing the product pursuant to design instructions, and controlling the table to fabricate the designed product. The studio is transportable via the ground-engaging wheels to a customer's location to design and fabricate a prototypical corrugated product on-site.

These and other aspects of the invention are not intended to define the scope of the invention for which purpose claims are provided. In the following description, reference is made to the accompanying drawings, which form a part hereof, and in which there is shown by way of illustration, and not limitation, preferred embodiments of the invention.

BRIEF DESCRIPTION OF THE DRAWINGS

Reference is hereby made to the following figures in which like reference numerals correspond to like elements throughout, and in which.

DETAILED DESCRIPTION OF THE PREFERRED EMBODIMENT

Figure 1:
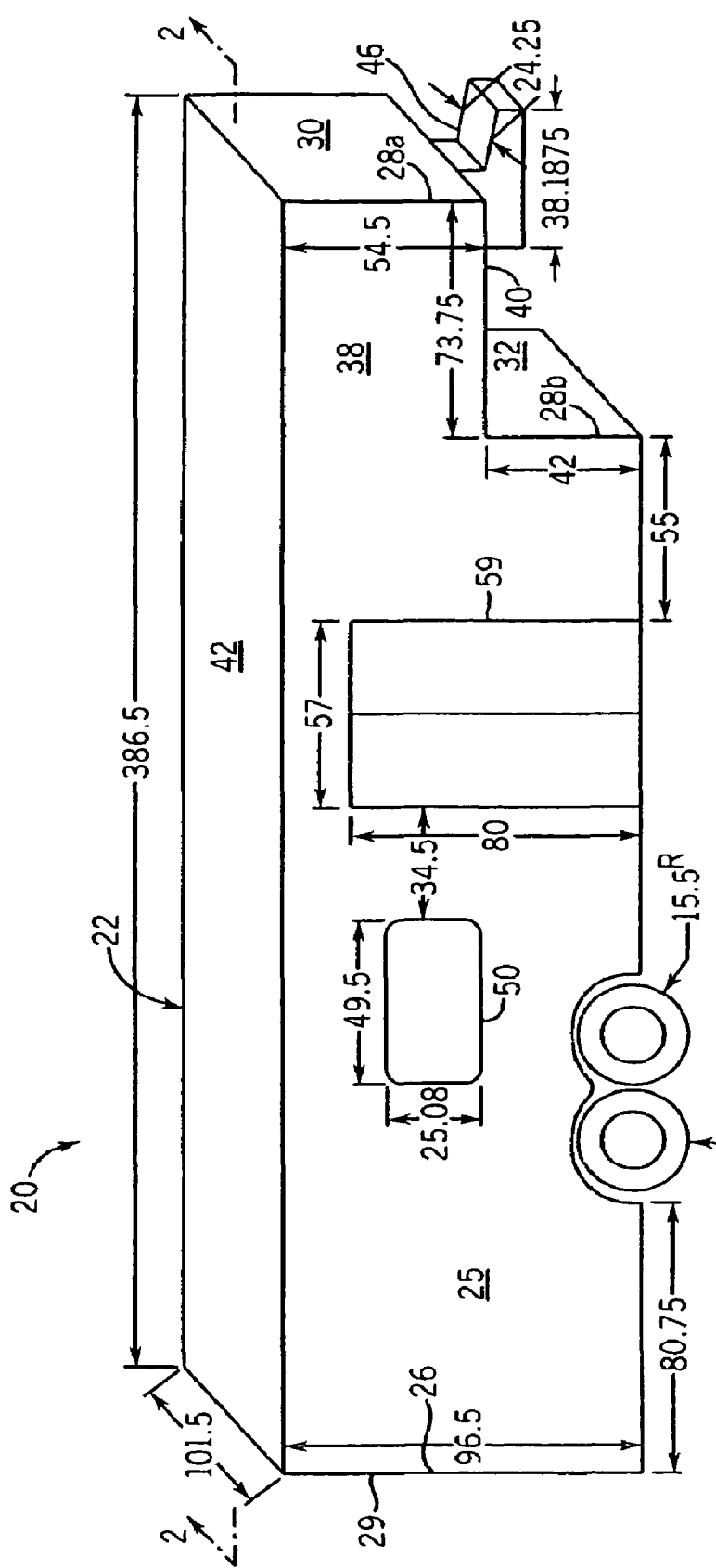
FIG. 1 is a perspective view of the exterior of a mobile studio constructed in accordance with a preferred embodiment of the invention.
Figure 2:
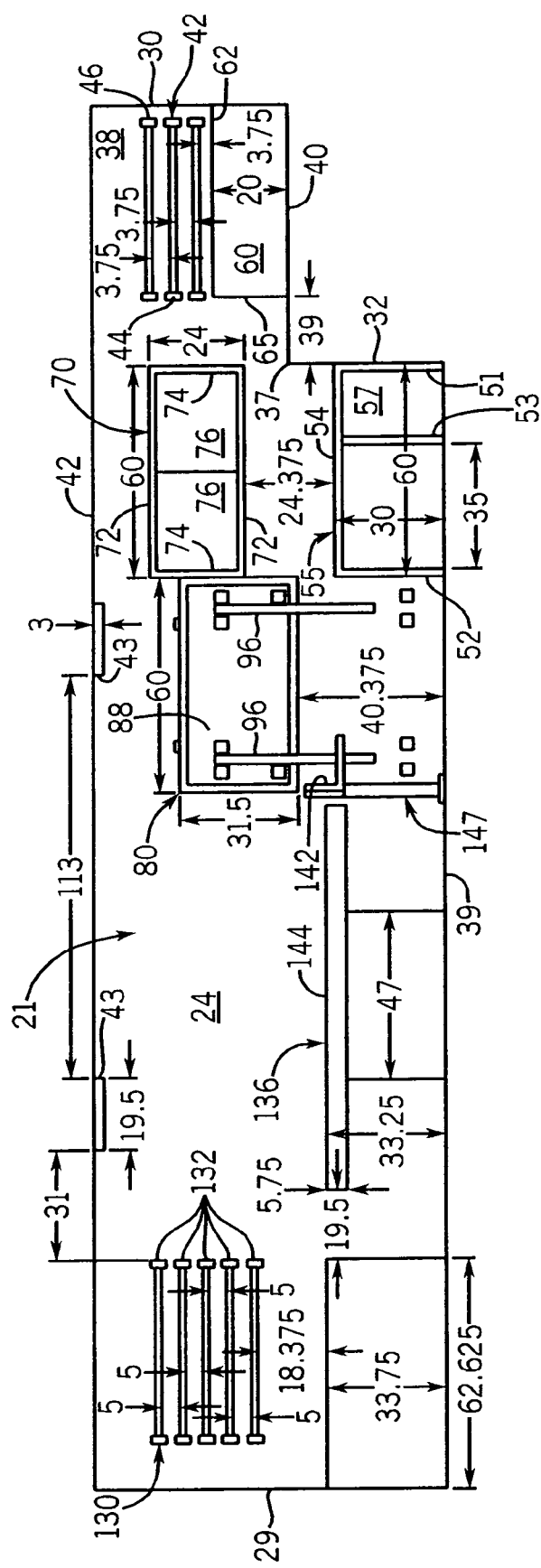
FIG. 2 is a side elevation view of the interior of the mobile studio illustrated in FIG. 1 taken along line 2—2.

Referring to FIGS. 1 and 2, the preferred embodiment of the present invention provides a trailer 20 that defines an enclosure 22 housing a mobile studio 21 for fabricating prototypical corrugated paperboard products. The enclosure 22 is defined by a pair of elongated longitudinally extending side walls 24 and 25 that are connected at their rear ends 26 by a rear end wall 29 that extends laterally therebetween. When viewing trailer 20 from a rear-to-forward orientation, side wall 25 defines the right side of the trailer, while side wall 24 defines the left side of the trailer. Accordingly, side walls 24 and 25 are also referred to herein as the left side wall and right side wall, respectively. It should be further appreciated that, unless otherwise specified, the dimensions illustrated in the figures and used throughout this disclosure refer to the various components of the mobile studio 21 in inches. The present invention is not limited, however, to the specific dimensions described in accordance with the preferred embodiment.

Side walls 24 and 25 define an upper front end 28a and a lower front end 28b that is rearwardly offset from upper front end 28a. The upper front end 28a f side walls 24 and 25 is connected to an upper front end wall 30, and the lower front end 28b of side walls 24 and 25 is connected to a lower front end wall 32 that is readwardly offset from upper front end wall 30. A base 40 extends horizontally between the upper end of lower end wall 32 and the lower end of upper end wall 30. An upper forward internal chamber 38 is thus defined by upper front end wall 30, side walls 24 and 25, and base 40. Side walls 24 and 25, rear end wall 29, and lower front end wall 32 are connected at their corresponding lower edges to a horizontally extending base 39 that provides a floor for the trailer 20. Side walls 24 and 25, rear end wall 29, and first upper front end wall 30 are connected at their upper edges to a horizontally extending ceiling 42. Walls 24, 25, 29, 30, 32, base 40, the floor provided by base 39, and ceiling 42 all present an inner surface that defines the outer perimeter of mobile studio 21. Studio 21 includes a plurality of lights 43 that are disposed at the interface between side walls 24 and 25 and ceiling 42 and are wired to an electrical source (not shown) to provide illumination.

Figure 3:
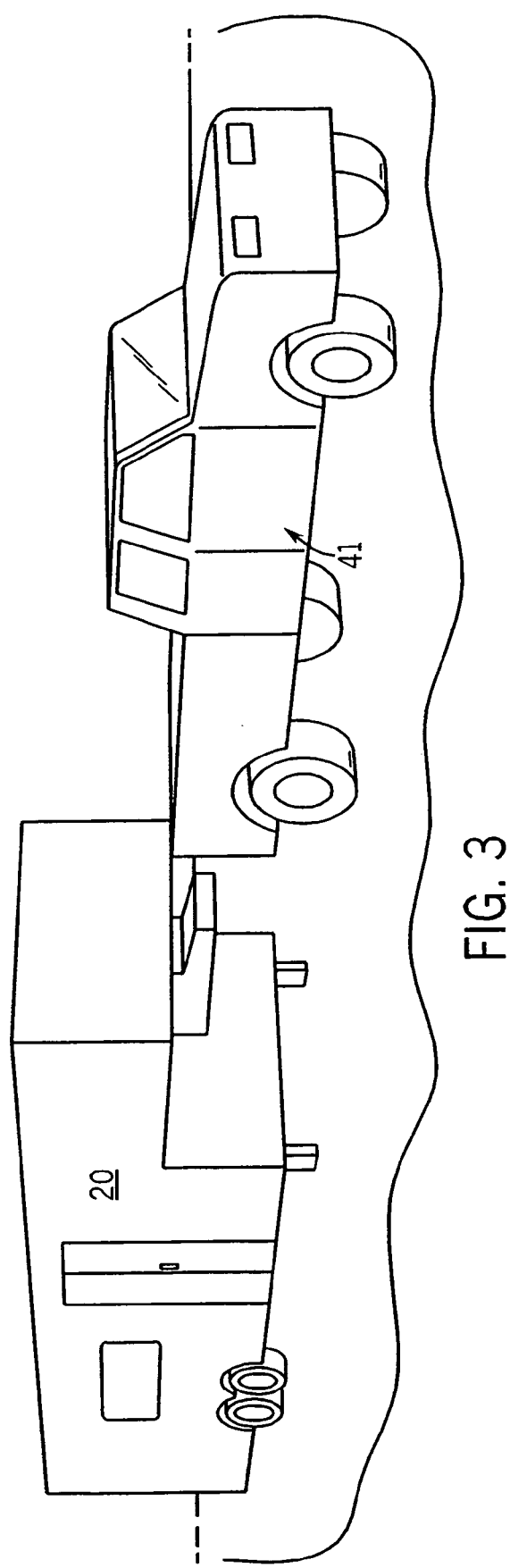
FIG. 3 is a schematic perspective view of the mobile studio illustrated in FIG. 1 being attached to a towing vehicle.

Referring also to FIG. 3, trailer 20 as illustrated is commonly known as a fifth wheel trailer, due to the manner in which the trailer is connected to a towing vehicle 41 that provides a conventional fifth wheel hitch (not shown) on the bed of the cargo box of the vehicle. A hitch 46 extends downwardly and forwardly from base 40 of forward chamber 38, and is configured to be mounted onto the fifth wheel hitch. The rear end of trailer 20 is supported by a set of wheels 35 in the known manner to facilitate transportation of trailer 20. Accordingly, the trailer 20 may be transported from the designer/manufacturer of corrugated paper products to a customer that desires a suitable prototype of POP packaging or displays to be produced more quickly than prior art techniques. It should be appreciated, however, that the present invention is not to be limited in scope to the trailer 20 described and illustrated herein. Rather, a skilled artisan will appreciate that numerous modifications to trailer 20 are available, and intended to fall within the scope of the present invention, so long as the trailer provides a mobile enclosure containing a studio that is transportable to a remote location and capable of design and/or fabricating prototype paper board products. As an example, studio 21 could alternatively be disposed in a motorized vehicle such as a motor home type vehicle.

The various components of mobile studio 21 will now be described in accordance with the preferred embodiment, beginning at the upper front end wall 30 and progressing generally rearwardly to rear end wall 29. Throughout the description below, the term "lateral" is used to define a horizontal direction parallel to front 30, 30 and rear 29 end walls, while the term "longitudinal" is used to define a horizontal direction parallel to side walls 24 and 25.

Figure 4:
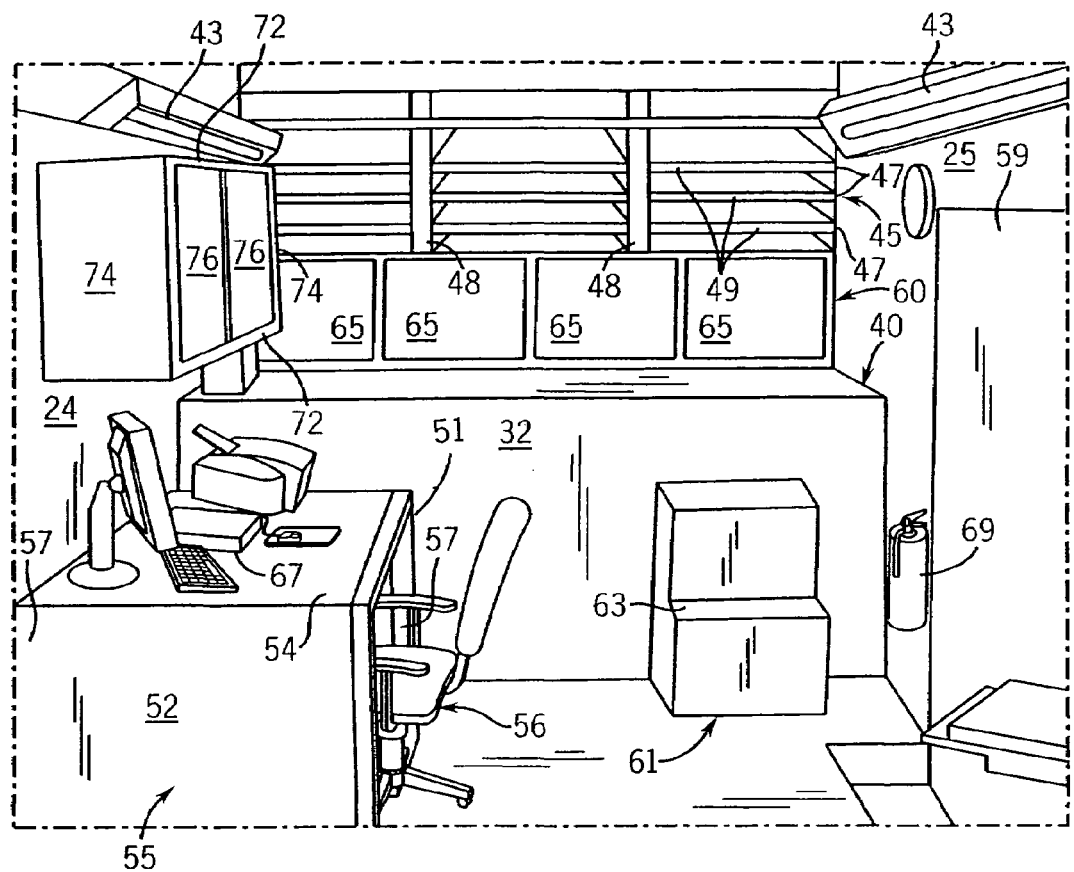
FIG. 4 is a schematic perspective view of the front end of the interior of the mobile studio illustrated in FIG. 2.

In particular, referring now also to FIG. 4, a rack 45 is provided that includes a plurality of shelves 47 extending inwardly from the upper end of the inner surface of upper front end wall 30, and are spaced downwardly with respect to each other from a location proximal ceiling 42. Shelves 47 define a rear end 46 (FIG. 2) that is mounted to front end wall 30 a distance 23.75 inches above base 40, and a front end 44. The shelves 47 are vertically separated from each other by 3.75 inches. Shelves 47 thus extend readwardly a distance of 34.75 inches from first front wall 30, and extend between side walls 24 and 25. Shelves 47 are also sloped downwardly to terminate at corresponding lips 49 that extend slightly upwardly from front ends 46. The downward tilt of shelves 47 ensures that the stored contents are biased towards the opening at front end 46 and therefore accessible to the user. Lips 49 prevent the stored contents from sliding out of shelves 47. A pair of retention members 48 extends vertically across front ends 46 to further secure the stored contents in shelves 47 during transportation of mobile studio 21. Rack 45 is thus particularly suitable for retaining stock paper board and the like.

A cabinet 60 is disposed beneath shelves 47 and has a base that is provided by wall 40, and a rear wall that is provided by upper front end wall 30. An upper wall 62 of cabinet 60 extends rearwardly from upper front end wall 30 at a distance approximately 20 inches above wall 40 and 3.75 inches below the lowest shelf 47. Cabinet 60 has lateral edges defined by side walls 24 and 25 of trailer 20. Walls 30, 40, 62, 24, and 25 define a cavity that is enclosed at the front end of cabinet 60 by a plurality of vertically disposed doors 65 that are hinged about a vertical axis to open and close cabinet 60 and provide access to the corresponding enclosure. A step ladder 61 is disposed on floor 39 adjacent wall 32, and includes a pair of steps 63 that enable a user to conveniently access the stored contents of shelves 47. A fire extinguisher 69 is also provided at the front end of side wall 25.

Figure 5:
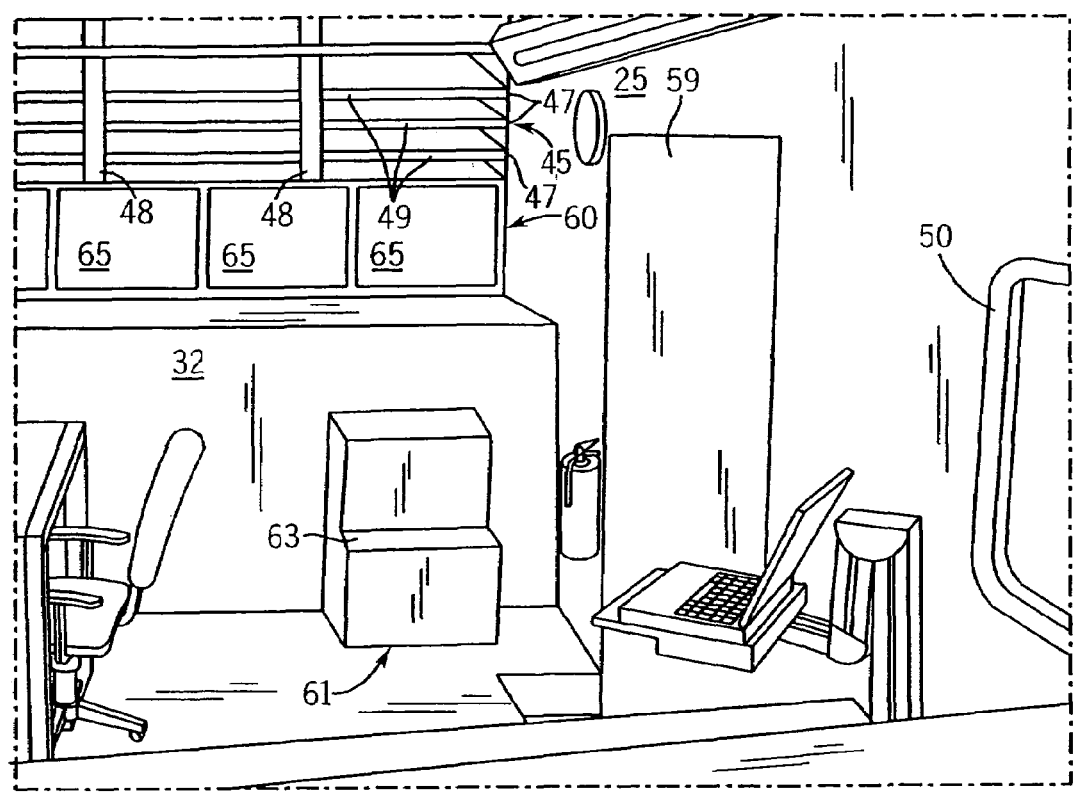
FIG. 5 is a schematic perspective view of the right-front end of the interior of the mobile studio illustrated in FIG. 2.

Referring also to FIG. 5, trailer 20 includes a door 59 extending through right side wall 25 at a location between wheels 35 and lower front end wall 30. Door 59 may be opened and closed in a known manner to provide access to and from mobile studio 21. Trailer 20 further preferably includes at least one window, such as window 50 formed in right side wall 25 disposed adjacent and rearwardly of door 59.

Figure 6:
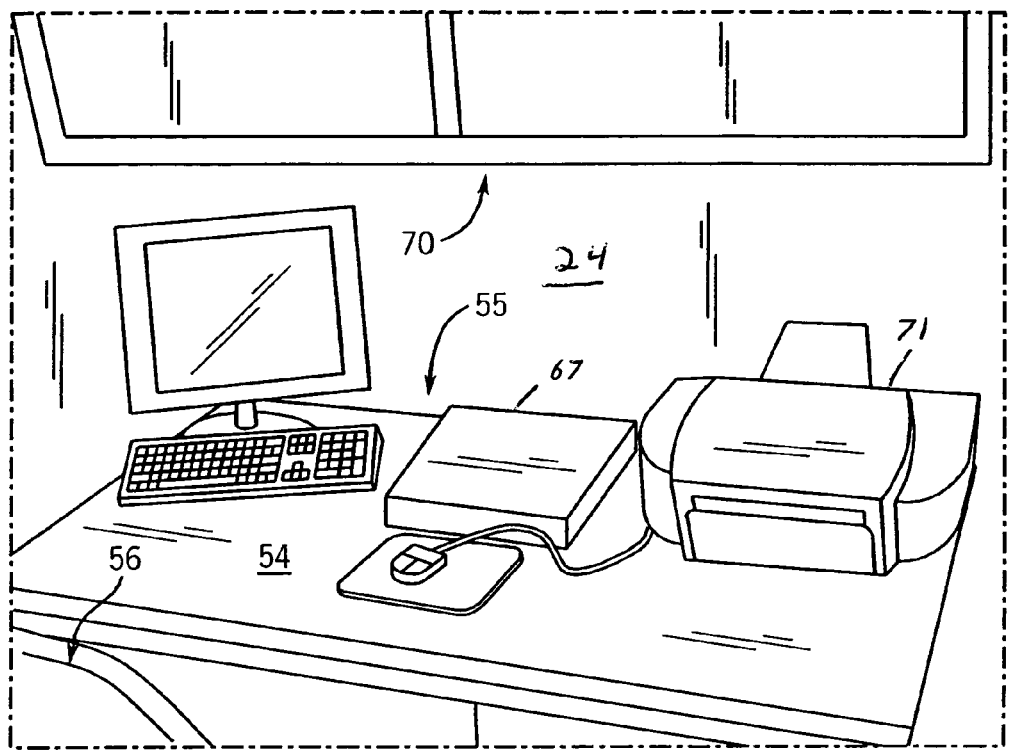
FIG. 6 is a schematic perspective view of a portion of the left side of the interior of the mobile studio illustrating appliances disposed on a desk.
Figure 7:
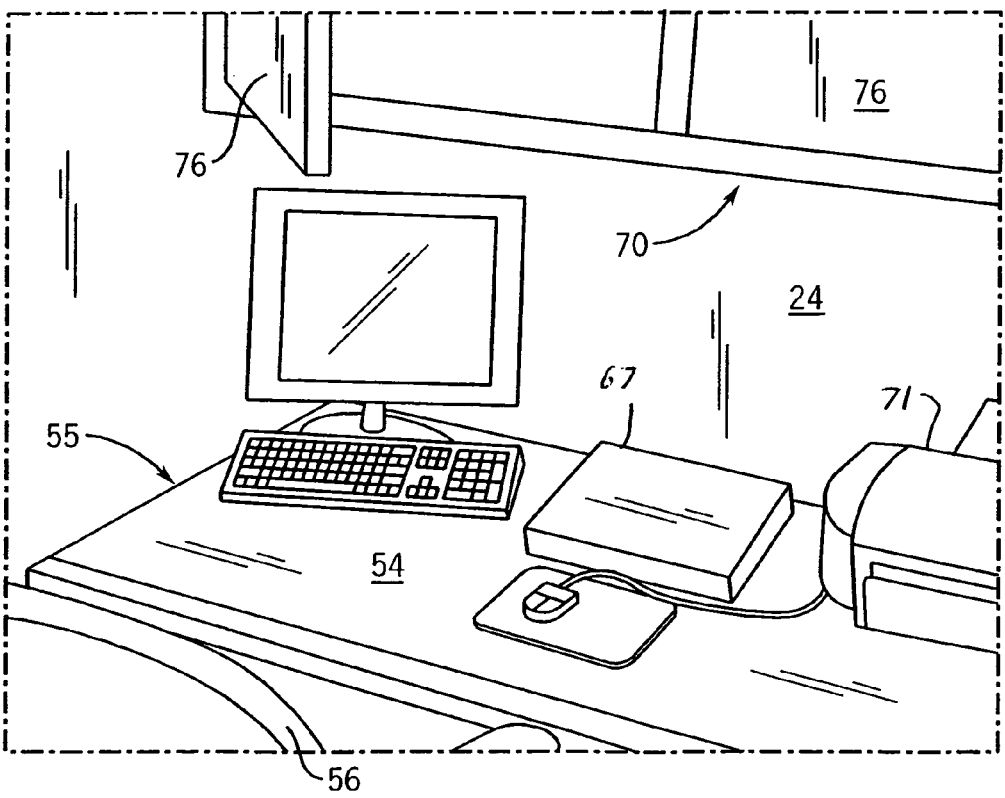
FIG. 7 is schematic perspective view of a portion of the left side of the interior of the mobile studio.
Figure 8:
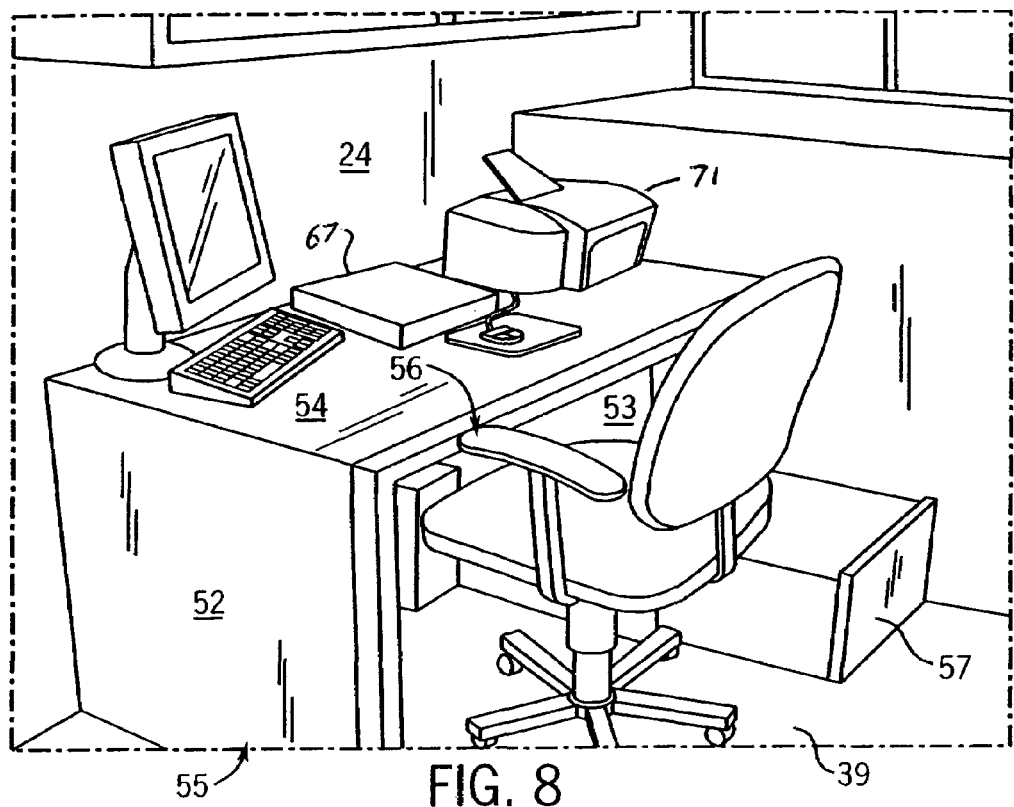
FIG. 8 is a schematic perspective view of the left-front end of the interior of the mobile studio.

Referring again to FIG. 4 and also to FIGS. 6–8, a desk 55 is placed on floor 39 and extends readwardly and laterally inwardly from the intersection between left side wall 24 and front end wall 30. Desk 55 includes a first side wall 51 that is disposed adjacent lower front end wall 30 and extends approximately 30 inches above floor 39, and a second side wall 52 offset approximately 5 feet behind first side wall 51. A flat upper desk surface 54 extends horizontally between side walls 51 and 52, and provides a working surface upon which a computer monitor, a fax machine, and like office supplies may be situated. The computer monitor is connected to an output of a traditional computer 67 having a processor, memory, and at least one input. The computer may be used to run graphics programs, word processing programs, email programs, and similar computer programs as are well known, and may be provided with a wireless interface to the Internet to expand its communication capabilities. Desk 55 further includes a separator wall 53 that is disposed between side walls 51 and 52 at a location approximately 35 inches from side wall 52 that extends vertically from floor 39 to upper surface 54. A knee hole is thereby formed between walls 52 and 53 for receiving a chair 56. A set of drawers 57 is disposed between walls 53 and 51 that may be opened and closed to access various stored office supplies.

Referring now to FIGS. 2, 4, 6, and 7, mobile studio 21 provides further storage by way of a cabinet 70 that is mounted on left side wall 24 at a location above desk 55. Cabinet 70 includes first and second longitudinally elongated upper and lower walls 72 that are connected at their outer ends to vertical side walls 74. Walls 72 extend longitudinally a distance of 60 inches, and walls 74 extend vertically a distance of 24 inches. Lower wall 72 is disposed approximately 2 feet above upper surface 54 of desk 55 so as to be placed in vertical alignment with desk 55. Cabinet 70 further includes a pair of doors 76, each door hingedly connected at its longitudinal outer end to corresponding side walls 74. Doors 76 may thus be pivoted about side walls 74 between their closed position illustrated in FIGS. 4 and 6, and the open position illustrated in FIG. 7.

Figure 9:
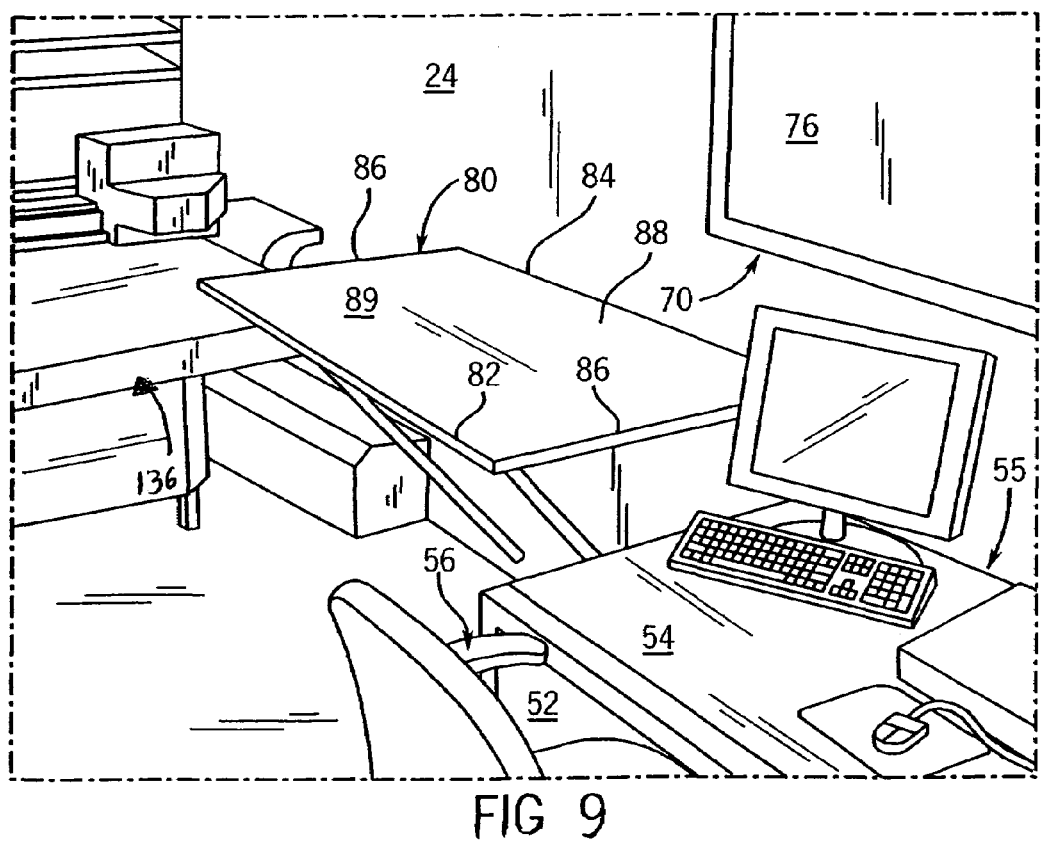
FIG. 9 is a schematic perspective view of the left-rear end of the interior of the mobile studio illustrated in FIG. 2.
Figure 10:
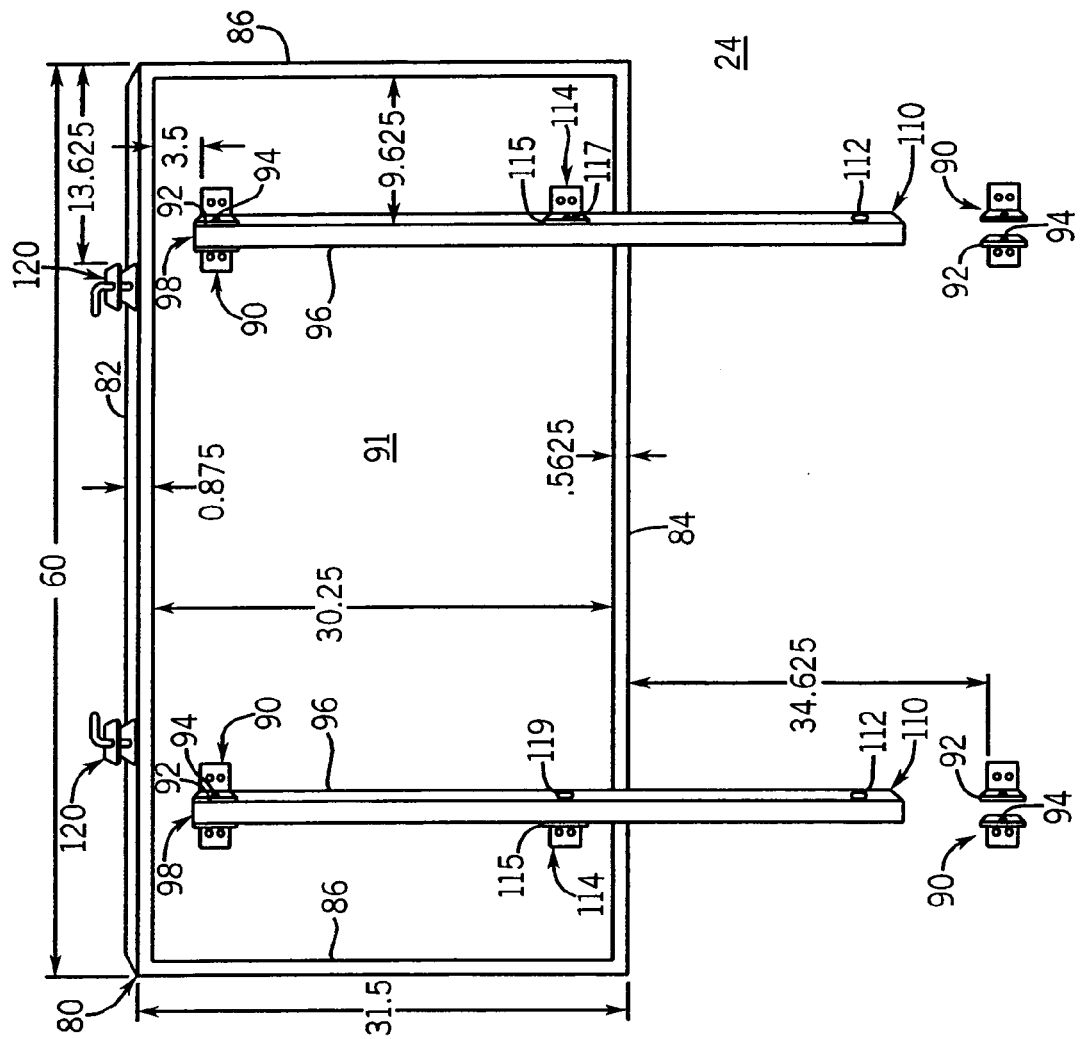
FIG. 10 is a side elevation view of a retractable table illustrated in FIG. 9.
Figure 11:
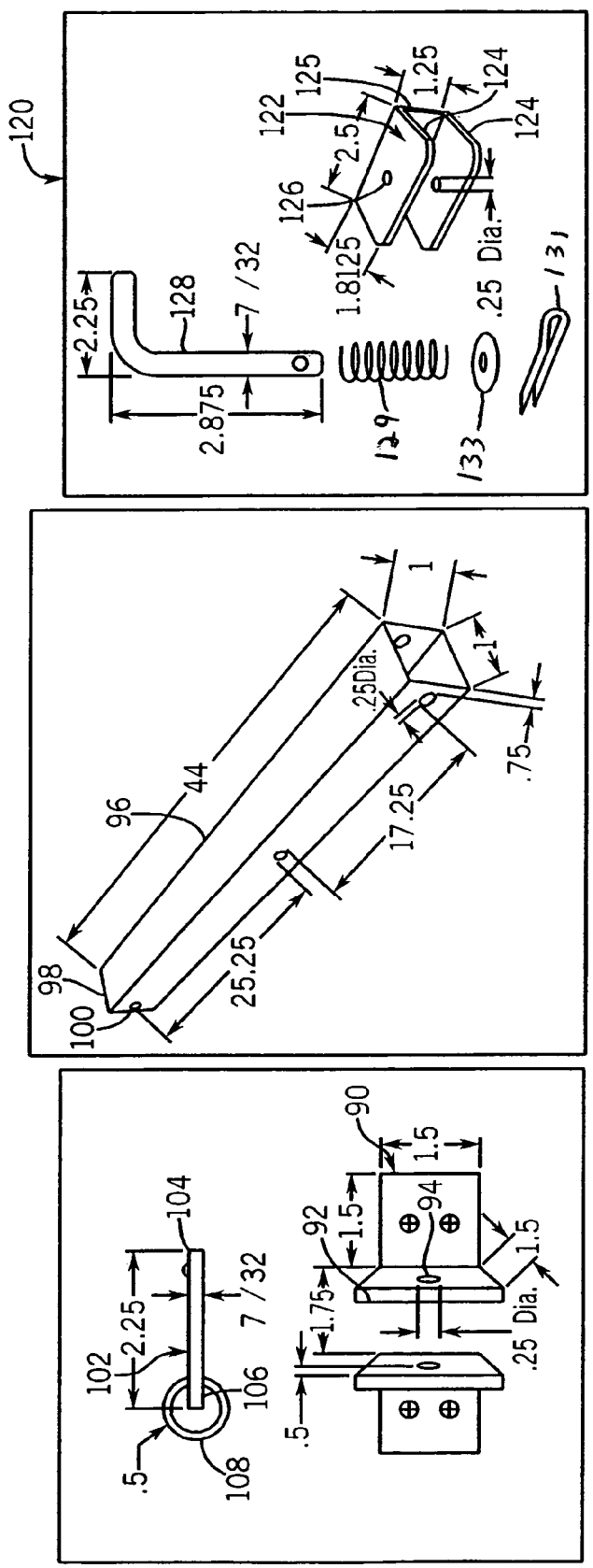
FIG. 11 is a side elevation view of various components of the retractable table illustrated in FIG. 10.

Referring now to FIGS. 2 and 9–11, a retractable table 80 is mounted to left side wall 24 to provide additional work space in studio 21. Table 80 is movable between an extended position, as illustrated in FIG. 9, and a retracted position, as illustrated in FIG. 10. In particular, table 80 includes first and second side walls 82 and 84 that extend 60 inches longitudinally. Walls 82 and 84 are joined at their outer ends by walls 86 that extend 31.5 inches laterally. When table 80 is extended, wall 84 is disposed adjacent left side wall 24 and wall 82 extends into the interior of enclosure 22. Walls 82, 84, and 86 define the boundaries of a platform 88 whose upper surface 89 provides a working space when table 80 is extended. When table 80 is retracted, platform 88 extends parallel to, and adjacent, trailer side wall 24 with upper surface 89 facing side wall 84 and table side wall 82 disposed above table side wall 86.

Table 80 is supported by a pair of legs 96 that are connected at their upper end 98 to the bottom surface 91 of platform 88. Legs 96 each extend laterally outwardly and downwardly from upper end 98 towards a lower distal end 110 that is connected to wall 24 when table 80 is extended. A corresponding pair of brackets 90 is mounted to the bottom surface 91, and define a corresponding pair of vertically extending grooves 92 defined by side walls that extend outwardly from bottom surface 91. The side walls define a pair of apertures 94 extending horizontally therethrough. A corresponding pair of apertures 100 extend through the upper ends 98 of legs 96 that are configured to mate with apertures 94 when the upper ends 98 are inserted into the grooves 92 of brackets 90. An elongated pin 102 has a first notched end 104 and a free end 106. The free end 106 of pin 102 is inserted through apertures 94 and 100 to fasten member 96 to the bracket 90. A wire coil 108 is subsequently fed through an opening in free end 106 to lock the pin in place. Accordingly, legs 96 are rotatable with respect to brackets 90 about their upper ends 98.

A second pair of brackets 90 is mounted on left side wall 24 in vertical alignment with legs 96, and positioned below wall 84 of table 80 such that upper working surface 88 will extend horizontally when table 80 is extended. Apertures 112 extend horizontally through lower ends 110 of legs 96 that are configured to align with apertures 94 of lower brackets 90 when table 80 is extended. Pin 102 is inserted through apertures 94 of lower brackets 90 and apertures 112 of lower ends 110 to fix legs 96 with respect to side wall 24.

A third pair of brackets 114 is mounted at the lower end of inner surface of platform 80, in alignment with legs 96, and operable to retain the legs in a flat position against the bottom surface 91 of table 80 when the table is retracted. Accordingly, when legs 96 are fastened to brackets 114, upper ends 98 are prevented from rotating about upper brackets 90, for example, during transportation of trailer 20. Brackets 114 include side walls 115 that extend outwardly from bottom surface 91 and define apertures 117 extending therethrough that are configured to mate with corresponding apertures 119 extending through legs 96. Pin 102 may be inserted through apertures 117 and 119 to lock legs 96 in their storage position.

Table 80, and specifically the outer edge of side wall 82, is connected to a pair of release mechanisms 120 that may be locked to retain table 80 in its retracted position, and subsequently unlocked when it is desirable to extend table 80. Each mechanism 120 includes a U-shaped bracket member 122 having side walls 124 extending outwardly from base 125. A corresponding pair of aligned apertures 126 extend through side walls 124. Base 125 is mounted onto side wall 24 such that one of the side walls 124 extends horizontally parallel to, and generally abuts, wall 82 when table 80 is retracted. Apertures 126 thus extend vertically through bracket walls 124 and are aligned with corresponding apertures (not shown) that extend partially into wall 82 that are configured to receive a pin 128. Pin 128 is biased downwardly into the aperture via spring member 129, and is retained by a washer 133 and fastener 131 when table 80 is locked in its retracted position, and can be manually lifted out of the aperture against the spring force to extend the table 80.

During operation, pins 128 are disengaged from table 80, and pins 102 are removed from brackets 114 to place table 80 in its extended position. The lower ends 110 of legs 96 are then lowered while upper ends 98 pivot about upper brackets 90 such that apertures 112 and 94 are placed in alignment with surface 89 extending horizontally. Pins 102 are then inserted through apertures 112 and 94 to lock legs 96 and table 80 in the extended position. Table 80 is retracted by removing pins 102 from brackets 90 and apertures 112 and subsequently engaging wall 82 with release mechanisms 120 such that upper surface 89 of platform 88 is disposed flat against side wall 24. Pins 102 are then inserted into apertures 117 and 119 to lock legs 96 in their retracted positions.

Figure 12:
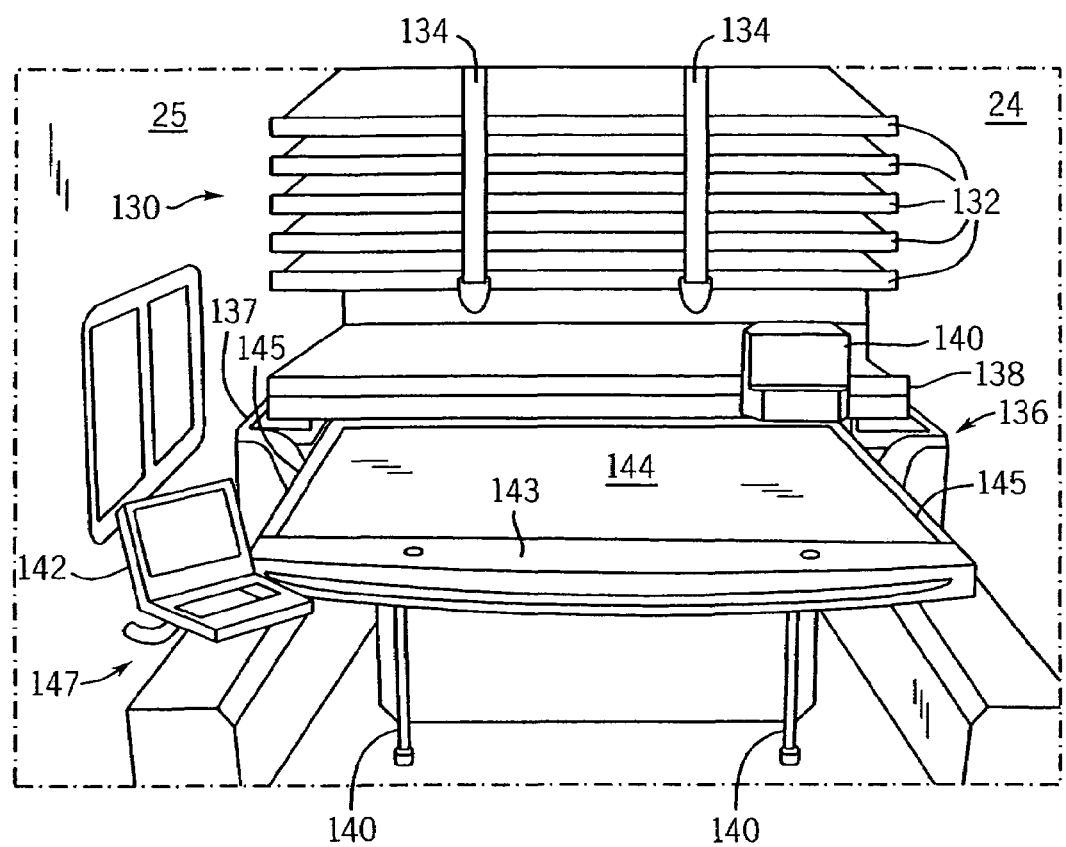
FIG. 12 is a schematic perspective view of the rear end of the interior of the mobile studio illustrated in FIG. 2.

Referring now to FIGS. 2 and 12, a rack 130 is disposed at the rear end of mobile studio 21, and includes a plurality of shelves 132 for the storage of corrugated paper board products and prototype POP displays and packaging. Shelves 132 extend laterally between side walls 24 and 25 a distance of 99.75 inches, and extend forwardly from the upper end of rear wall 29 a distance of 49.75 inches. Shelves 132 are spaced vertically from each other a distance of 5 inches, and are sloped downwardly so as to bias the stored contents towards the outer end of racks 130 for easy access to the user. A pair of straps 134 extends vertically across the outer ends of racks 130 to retain the stored contents, for example, during travel of the mobile studio 21. Straps 134 may be removed when access to stored contents is desired.

Figure 13:
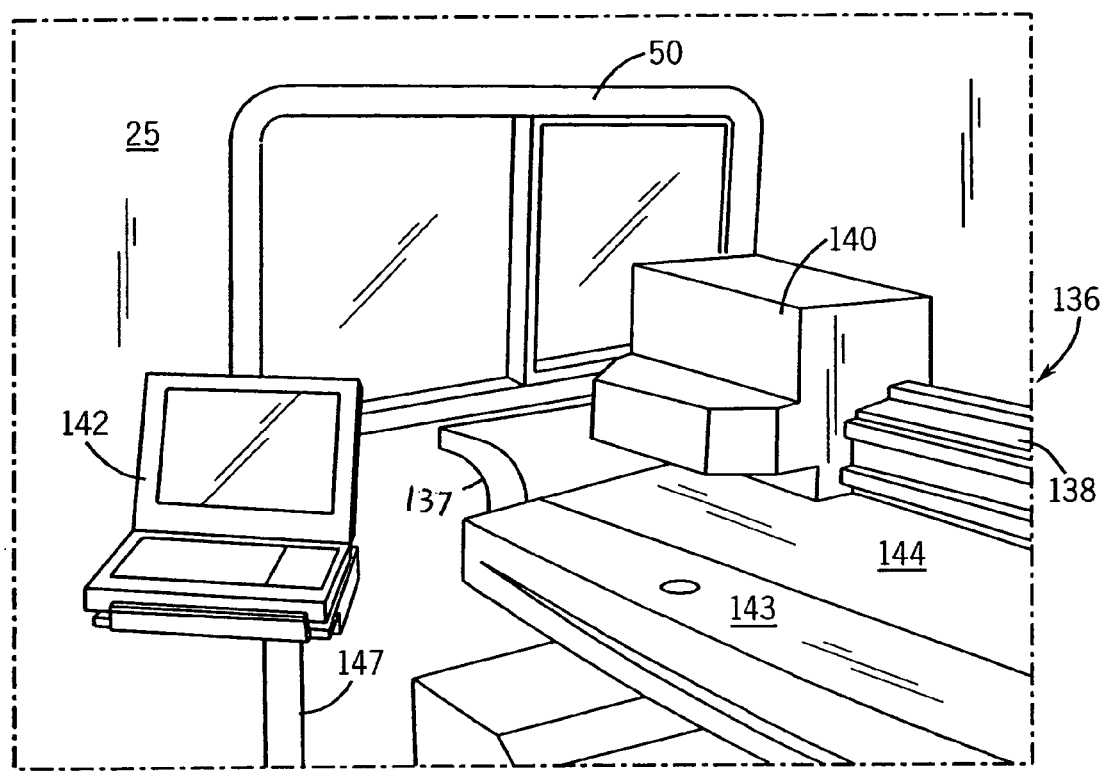
FIG. 13 is a schematic perspective view of the right-rear end of the interior of the mobile studio illustrated in FIG. 2.

Referring now to FIGS. 2, 12, and 13, mobile studio 21 further includes a cutting/creasing board 136 having a base 138 that is supported on floor 39 via a plurality of legs 140.

A horizontally extending cutting/creasing board 136 is supported by base 138 via longitudinally extending guide rails 137 (one shown in FIG. 13) and defines opposing lateral edges 143 and longitudinal edges 145. Guide rails 137 support longitudinal translation of cutting board 136 during operation. Cutting board 136 presents an upwardly facing cutting surface 144 upon which a guide rail 138 is disposed. Guide rail 138 extends laterally across cutting surface 144, and is movable in the longitudinal direction. Guide rail 138 supports a tool head 140 that supports suitable a tool in contact with a paperboard and operable when designing and fabricating a prototypical product from the paperboard. Suitable tools include a crease tool, knife tool, and pen tool of the type commercially available from Esko-Graphics (formerly Barco Graphic Systems), located in Vandalie, Ohio. Head 140 is movable in the lateral direction along rail 138 during operation, while cutting board 136 translates longitudinally to enable tool head 140 to move both laterally and longitudinally with respect to the supported paperboard product. Cutting board 136 may be selected from any known suitable cutting/creasing table, such as the XL-20 table commercially available from Esko-Graphics.

Figure 14:
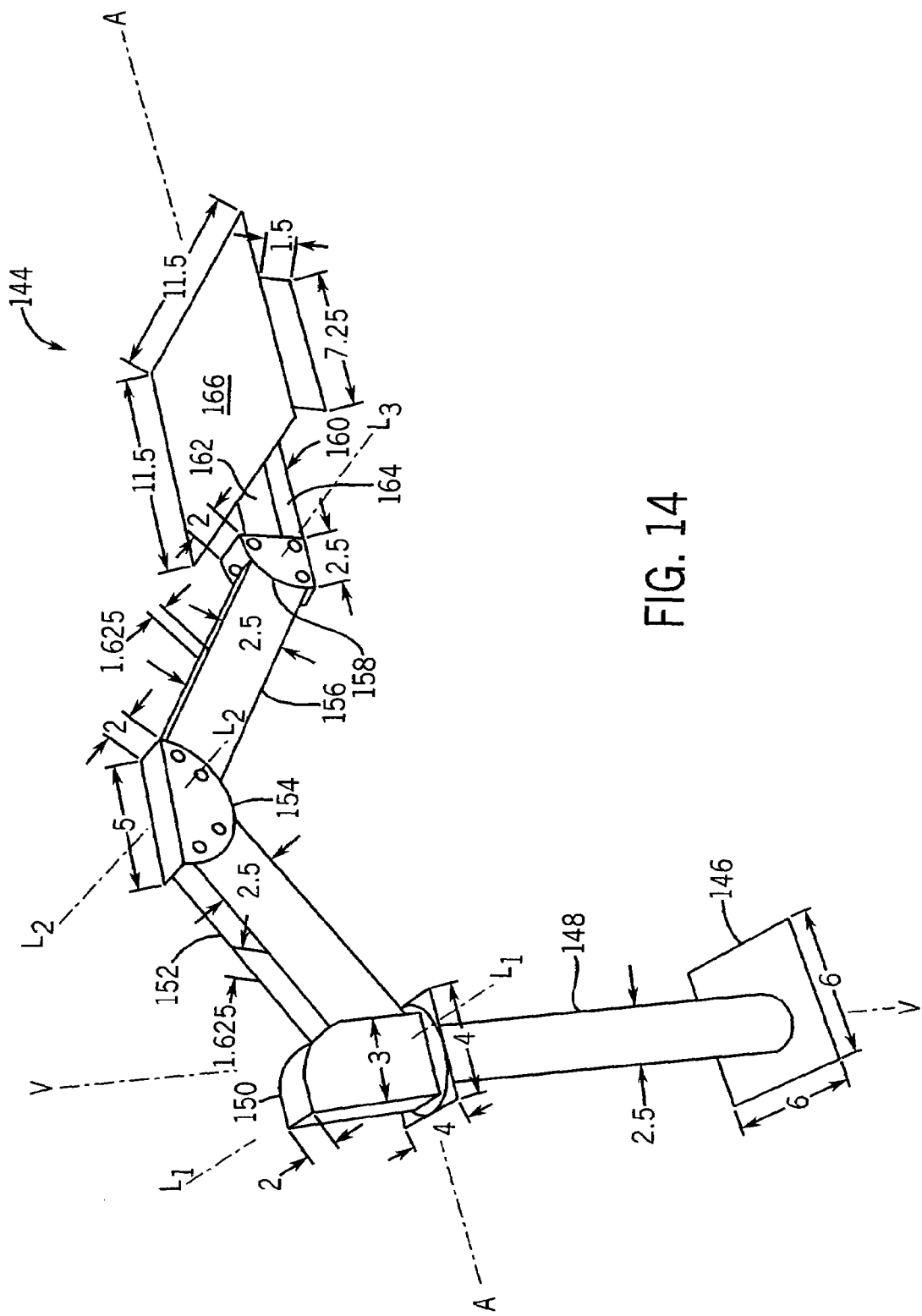
FIG. 14 is a perspective view of a computer stand illustrated in FIG. 13.

The movement and operation of guide rail 138, tool head 140, and its associated tool are controlled by a dedicated computer that is supported by a computer stand 147 as further illustrated in FIG. 13 and 14. Computer 142 includes a conventional central processor communicating with memory, at least one input device, and at least one output device. The processor is further coupled to a driver (not shown) that provide an interface to cutting/creasing board 136. The computer 142 executes a stored program that receives prototype design input commands from the user, and communicates control instructions to cutting board 136. Cutting board 136 thus operates in a manner similar to those commercially available and widely used in manufacturing plants. While computer 142 is a notebook computer in accordance with the preferred embodiment, it should be appreciated that the computer may alternatively comprise any suitable data entry device capable of controlling cutting/creasing board 136. For instance, computer 142 could be integrated into cutting board 136 as a single unit. Computer 124 is preferable a notebook computer, however, so as to provide enhanced portability and convenience to an operator stationed at cutting board 136, as will now be described. Also, computer 142 could be networked with the computer 67 on desk 55, for example, for file sharing and other communications.

In particular, referring also to FIG. 14, computer stand 147 includes a generally square base 146 that rests on floor 39 and supports a cylindrical support column 148 extending upwardly therefrom along the direction of vertical axis V—V. The upper end of column 148 is connected at its upper end to a joint 150 that is connected to a first arm 152 extending outwardly therefrom. Joint 150 enables arm 152 to be rotatable about the vertical axis V—V, and further pivotable about lateral axis $L_1$—$L_1$ that extends orthogonal to axis V—V and is further orthogonal to the direction of extension of arm 152. Arm 152 is further connected at its outer end to a second joint 154, which is in turn, connected to a second arm 156. Joint 154 enables pivoting of arm 156 relative to arm 152 about the lateral axis $L_2$—$L_2$.

Accordingly, the distal end of arm 156 may be translated longitudinally inwardly when arm 156 is rotated counterclockwise about joint 150, and arm 156 is rotated clockwise about joint 154. Conversely, the distal end of arm 156 may be extended in the longitudinal direction when arm 152 is rotated clockwise about joint 150, and arm 156 is pivoted counterclockwise about joint 154. The distal end of arm can thus travel in the longitudinal direction along axis A—A a distance equal to the cumulative lengths of arms 152 and 156 relative to support column 148. Arm 156 is connected at its distal end via a joint 158 to a third arm 160. Arm 160 is a beam having an upper face 162 and side walls 164 such that arm 160 provides a guide rail for a supported plate 166. Arm 160, and therefore plate 166, is pivotable about the longitudinal axis $L_3$—$L_3$ to maintain a substantially horizontal disposition of plate 166. Plate 166 is slidable along arm 162 in the direction of longitudinal axis A—A relative to arms 152 and 156. A stop (not shown) is disposed at the distal end of arm 162 to prevent plate 166 from becoming disengaged with the stand 147. A laptop computer, such as computer 142, may be stationed on plate 166 and positioned using computer stand 147 as desired during operation of cutting board 136.

A method for designing a prototype paperboard product begins when a paperboard manufacturer receives instructions from a customer regarding a prototype for a paperboard product, such as a POP display. The manufacturer can then design and manufacture an initial corrugated paperboard product pursuant to the customer's instructions, either at design/manufacturing plant in accordance with conventional methods. Alternatively, the initial design can be fabricated in mobile studio 21 either on-site at the customer's location, or in route to the customer. In this regard, it should be appreciated that the design instructions could be communicated directly from the customer to the mobile studio 21 via communications devices disposed within the studio. For instance, a facsimile machine 71 is provided on desk 55, which can include an integrated telephone as is well known. Facsimile machine 71 and the telephone can be wireless and usable during transportation of mobile studio 21, and/or can include a jack that can be hard-wired when the studio is parked at its destination. Facsimile machine 71 can further provide a printer for computer 67. The initial product is then delivered to the customer either via conventional shipping methods or in-person, depending upon whether mobile studio 21 was used to fabricate the initial product.

After the customer has evaluated the initial product, the customer will likely suggest modifications that need to be made to the product. If the initial product was prepared at the manufacturing plant, the manufacturer can transport the mobile studio 21 to the customer location with the design of the initial prototype stored in computer 142. Alternatively, studio 21 may have already been transported to the customer in response to the initial design request. In response to customer feedback, the manufacturer enters the changes to the prototype in computer 142, places a paperboard product on table 136, and fabricates a revised prototype in studio 21. If desired, the manufacturer can record the changes made to the designs.

The customer then either accepts the revised prototype, or suggests further revisions. If revisions are necessary, computer 142 is updated accordingly, and a new product is produced. Once the prototype has been deemed suitable, the final design can be communicated from mobile studio 21 to the manufacturing plant, whereby mass production of the final design can begin. The present invention thus enables a manufacturer and a customer to iterate between designs in-person at a location remote from the manufacturing plant. Accordingly, proposed prototypes can be evaluated immediately after fabrication and revised as many times as necessary on-site, thereby avoiding the time delay associated with shipping in accordance with conventional techniques. Furthermore, design efficiency is increased because the customer is able to more easily convey the necessary changes to a manufacturer in person.

It should be appreciated that the components of mobile studio 21 and method of use have been described in accordance with the preferred embodiment. However, all components of mobile studio 21 described herein are not essential to carry out the steps of the present invention. Accordingly, one skilled in the art will appreciate that, unless otherwise specified, any component or components disposed within an enclosure that is mobile and capable of being transported from a first origination location (e.g., a manufacturer) to a remote destination location (e.g., customer) for the real time design and/or fabrication of prototype POP displays or packaging is intended to fall within the scope of the present invention.

The invention has been described in connection with what are presently considered to be the most practical and preferred embodiments. However, the present invention has been presented by way of illustration and is not intended to be limited to the disclosed embodiments. In order to apprise the public of the scope of the present invention, the following claims are provided.

We claim:

1. A mobile studio for fabricating, at a customer's site, a prototypical product of at least one of point-of-purchase displays and packaging to be mass-produced, the mobile studio comprising:
   a housing defining an enclosure, wherein the housing is supported by ground-engaging wheels, the enclosure containing:
      i. a table carrying tooling for performing at least one of cutting and scoring sheets of corrugated paperboard to produce the prototypical product pursuant to design instructions from the customer; and
      ii. a computer executing a stored program for designing the prototypical product pursuant to the design instructions from the customer, and controlling the table to fabricate the designed prototypical product;
   wherein the studio is transportable via the ground-engaging wheels to a customer's location to design and fabricate inside the enclosure a prototypical corrugated product on-site pursuant to the design instructions from the customer.

2. The mobile studio as recited in claim 1, wherein the enclosure further comprises a communications device receiving the design instructions.

3. The mobile studio as recited in claim 1, wherein the housing further comprises a hitch operable for connection to a motorized vehicle.

4. The mobile studio as recited in claim 1, wherein the enclosure further comprises shelving configured to store stock paperboard.

5. The mobile studio as recited in claim 4, wherein the shelving includes at least one manually disengageable member that retains stock paperboard within the shelving.

6. The mobile studio as recited in claim 1, wherein the enclosure further comprises a table surface that is movable between a retracted position, whereby the table surface rests against the housing in a substantially vertical orientation, and an extended position, whereby the table extends horizontally away from the housing.

7. The mobile studio as recited in claim 6, wherein the table surface is supported by the housing via a first bracket assembly that is locked to retain the table surface in the retracted position, and unlocked to position the table surface in the extended position.

8. The mobile studio as recited in claim 7, wherein the table surface is further supported by the housing via a second bracket assembly that is locked to retain the table surface in the extended position, arid unlocked to position the table surface in the retracted position.

9. The mobile studio as recited in claim 1, wherein the enclosure extends in an elongated longitudinal direction and in a lateral direction, and wherein the computer is supported by articulated arms that travel in the longitudinal and lateral direction, and wherein the arms rotate with respect to a vertical direction.

10. A method of fabricating prototypical corrugated paperboard products for a customer, comprising the steps of:
   (A) transporting a mobile design unit to a customer location, the mobile design unit including a housing that defines an enclosure that contains a table for performing at least one of cutting and scoring sheets of corrugated paperboard and a computer that executes a stored program to receive design instructions and control the cutting table pursuant to the design instructions;
   (B) receiving design instructions from the customer;
   (C) programming the table with the design instructions;
   (D) operating the table inside the enclosure to produce a prototype paperboard product pursuant to the design instructions;
   (E) providing modification instructions to produce a second product different than the product produced during step (D);
   (F) programming the table with the modification instructions;
   (G) operating the table to produce a paperboard product pursuant to the modification instructions;
   (H) determining final design instructions once the prototype has been finalized; and
   (I) communicating the final design instructions to a manufacturing facility for mass-production.

11. The method as recited in claim 10, wherein step (C) further comprises programming a computer executing a stored program to control the table.

12. The method as recited in claim 11, further comprising the step of creating an initial product prior to step (A).

13. The method as recited in claim 12, wherein the design instructions received at step (B) comprise modification instructions, wherein the product produced during step (D) is different than the initial product.

14. The method as recited in claim 10, further comprising producing final design instructions operable to create a suitable prototypical paperboard product.

15. The method as recited in claim 14, further comprising communicating the final design instructions to a paperboard product manufacturing plant.

16. The method as recited in claim 10, wherein step (E) further comprises producing a point-of-purchase display.

17. The method as recited in claim 10, wherein step (E) further comprises receiving the modification instructions from the customer.

* * * * *

UNITED STATES PATENT AND TRADEMARK OFFICE
CERTIFICATE OF CORRECTION

PATENT NO. : 6,969,102 B2
DATED : November 29, 2005
INVENTOR(S) : Douglas W. Orischak et al.

It is certified that error appears in the above-identified patent and that said Letters Patent is hereby corrected as shown below:

Column 4,
Line 17, change "readwardly" to -- rearwardly --.

Column 10,
Line 7, change "arid" to -- and --.

Signed and Sealed this

Fourteenth Day of March, 2006

JON W. DUDAS
*Director of the United States Patent and Trademark Office*